(12) United States Patent
Padhye et al.

(10) Patent No.: US 7,436,772 B2
(45) Date of Patent: Oct. 14, 2008

(54) AVAILABLE BANDWIDTH ESTIMATION

(75) Inventors: Jitendra D. Padhye, Redmond, WA (US); Venkata N. Padmanabhan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 11/088,130

(22) Filed: Mar. 23, 2005

(65) Prior Publication Data
US 2006/0215572 A1    Sep. 28, 2006

(51) Int. Cl.
*G01R 31/08* (2006.01)
*H04J 1/16* (2006.01)
*H04J 3/22* (2006.01)
*H04J 3/18* (2006.01)
*G08C 15/00* (2006.01)
*H04L 12/26* (2006.01)
*H04L 12/28* (2006.01)

(52) U.S. Cl. ............. 370/235; 370/236; 370/236.1; 370/395.21; 370/468; 370/477

(58) Field of Classification Search ............ 370/230, 370/252, 229, 231–236.1, 395.21, 468, 477
See application file for complete search history.

(56) References Cited

U.S. PATENT DOCUMENTS

| | | | |
|---|---|---|---|
| 6,795,401 B1* | 9/2004 | Fukuoka | 370/236 |
| 6,813,244 B1* | 11/2004 | He et al. | 370/235 |
| 7,180,858 B1* | 2/2007 | Roy et al. | 370/232 |
| 2002/0044528 A1* | 4/2002 | Pogrebinsky et al. | 370/230 |
| 2003/0076850 A1* | 4/2003 | Jason, Jr. | 370/414 |
| 2005/0100009 A1* | 5/2005 | Botvich | 370/389 |
| 2005/0201414 A1* | 9/2005 | Awais | 370/468 |
| 2005/0220035 A1* | 10/2005 | Ling et al. | 370/252 |
| 2006/0077981 A1* | 4/2006 | Rogers | 370/395.21 |
| 2006/0114834 A1* | 6/2006 | Cheung et al. | 370/252 |

(Continued)

FOREIGN PATENT DOCUMENTS

EP    1 335 525 A    8/2003

(Continued)

OTHER PUBLICATIONS

"Active Probing using Packet Quartets"—Attila Pasztor, Darryl Veitch; ACM ISBN 1-58113-603-X/02/0011 (Nov. 2002).*

(Continued)

*Primary Examiner*—Brenda Pham
*Assistant Examiner*—Xavier Szewai Wong
(74) *Attorney, Agent, or Firm*—Wolf, Greenfield & Sacks, P.C.

(57) ABSTRACT

A new system and method of available bandwidth estimation applies even where the narrow link and tight link in a network path are in different locations. In embodiments of the invention, a unique packet probe series structure and processing is employed to estimate available bandwidth. In an embodiment of the invention, the spacing between probe packets is adjusted at the source to account for dilation caused by links leading to the tight link, so that the spacing is appropriate when the probes arrive at the tight link. Moreover, the multi-packet probe comprises a large packet followed by two much smaller packets. The large packet is then dropped once it has traversed the tight link. The two small packets, which are impacted little by subsequent narrow links, preserve the spacing set by the tight link, encoding the delay induced by the tight link, all the way to the destination.

14 Claims, 4 Drawing Sheets

U.S. PATENT DOCUMENTS

| | | | |
|---|---|---|---|
| 2006/0114859 A1* | 6/2006 | Sudo et al. | 370/335 |
| 2006/0215574 A1* | 9/2006 | Padmanabhan et al. | 370/252 |
| 2006/0268825 A1* | 11/2006 | Westerberg | 370/352 |
| 2007/0086485 A1* | 4/2007 | Vega-Garcia et al. | 370/468 |

OTHER PUBLICATIONS

"Measuring Link Bandwidths Using a Deterministic Model of Packet Delay"—Kevin Lai, Mary Baker; ACM ISBN 1-58113-224-7/00/0008 (2000).*

Lai, K., et al., *"Measuring Link Bandwidths Using a Deterministic Model of Packet Delay"*, ACM SIGCOMM, Aug. 2000, (13 pages).

Strauss, J., et al., *"A Measurement Study of Available Bandwidth Estimation Tools"* ACM/USENIX IMC, Oct. 2003, (6 pages).

Lakshminarayanan, Karthik, et al., "Bandwidth Estimation in Broadband Access Networks", IMC '04, Oct. 25-27, 2004, Taormina, Sicily, Italy, (8 pages).

European Search Report from corresponding European Application No. 06111617.

Pasztor, A et al., *Active Probing Using Packets Quartets*, IMW'02m Nov. 6, 2002, XP002378474, http://delivery.acm.org/10.1145/640000/637247/p293-pasztor.pdf?key=637247&key2=7156406411&coll-GUIDE&d-GUIDE&CFID-74551417&/cftIJ/eb-98974457>.

* cited by examiner

AVAILABLE BANDWIDTH ESTIMATION

FIELD OF THE INVENTION

This invention pertains generally to computer networking and, more particularly, to a method and system of estimating bandwidth over a network path having different tight and narrow links.

BACKGROUND OF THE INVENTION

In a networking environment it is often important for entities involved in networking tasks to be able to estimate how much bandwidth is or could be available for a particular use. For example, if insufficient bandwidth is available, then it may not make sense to start a task that would have to be performed inadequately or later aborted. Often the streaming transmission of audio and video information requires a certain quality of service in order to provide a satisfactory user experience, and if that quality of service is not available then the user experience will be lacking.

Recent years have seen an increase in the popularity of networking technologies, and hence an increase in techniques intended to determine available bandwidth. Unfortunately, many of these techniques make assumptions that are not borne out in reality, and thus yield inaccurate estimations of available bandwidth. For example, the packet gap method (PGM) works correctly only if the narrow and tight link along an Internet path are the same.

The following references are incorporated herein by reference in their entireties for all that they disclose without exclusion, including the content of cited references therein, and may be of aid to the reader in understanding certain rudimentary aspects of bandwidth measurement: K. Lai and M. Baker, "*Measuring Link Bandwidths Using a Deterministic Model of Packet Delay*", ACM SIGCOMM, August 2000, and J. Strauss and D. Katabi and F. Kaashoek, "*A Measurement Study of Available Bandwidth Estimation Tools*", ACM/USENIX IMC, October 2003.

BRIEF SUMMARY OF THE INVENTION

In a network path, if the tight link is not the same as the narrow link, the critical assumptions inherent in the existing PGM techniques of available bandwidth estimation break down and the techniques no longer work. In embodiments of the invention, a unique packet probe series structure and processing is employed to estimate available bandwidth. In particular, the spacing between probe packets is first adjusted at the source to account for the dilation caused by the links leading up to the tight link, so that the spacing is appropriate when the probes arrive at the tight link. Moreover, a multi-packet probe is used in an embodiment of the invention. The multi-packet probe comprises a large packet, sometimes referred to herein as a "pilot" packet, followed by two much smaller packets. The large packet is then dropped once it has traversed the tight link. The two small packets, which are impacted little by subsequent narrow links, preserve the spacing set by the tight link (essentially encoding the delay induced by the tight link) all the way to the destination.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The present invention will be more completely understood through the following detailed description, which should be read in conjunction with the attached drawings. In this description, like numbers refer to similar elements within various embodiments of the present invention. Methods and systems for estimating bandwidth in broadband access networks and other networks will be described below. The skilled artisan will readily appreciate that the methods and systems described herein are merely exemplary and that variations can be made without departing from the spirit and scope of the invention.

Embodiments of the invention are illustrated as being implemented in a suitable computing environment. Although not required, the invention is described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced in a variety of computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
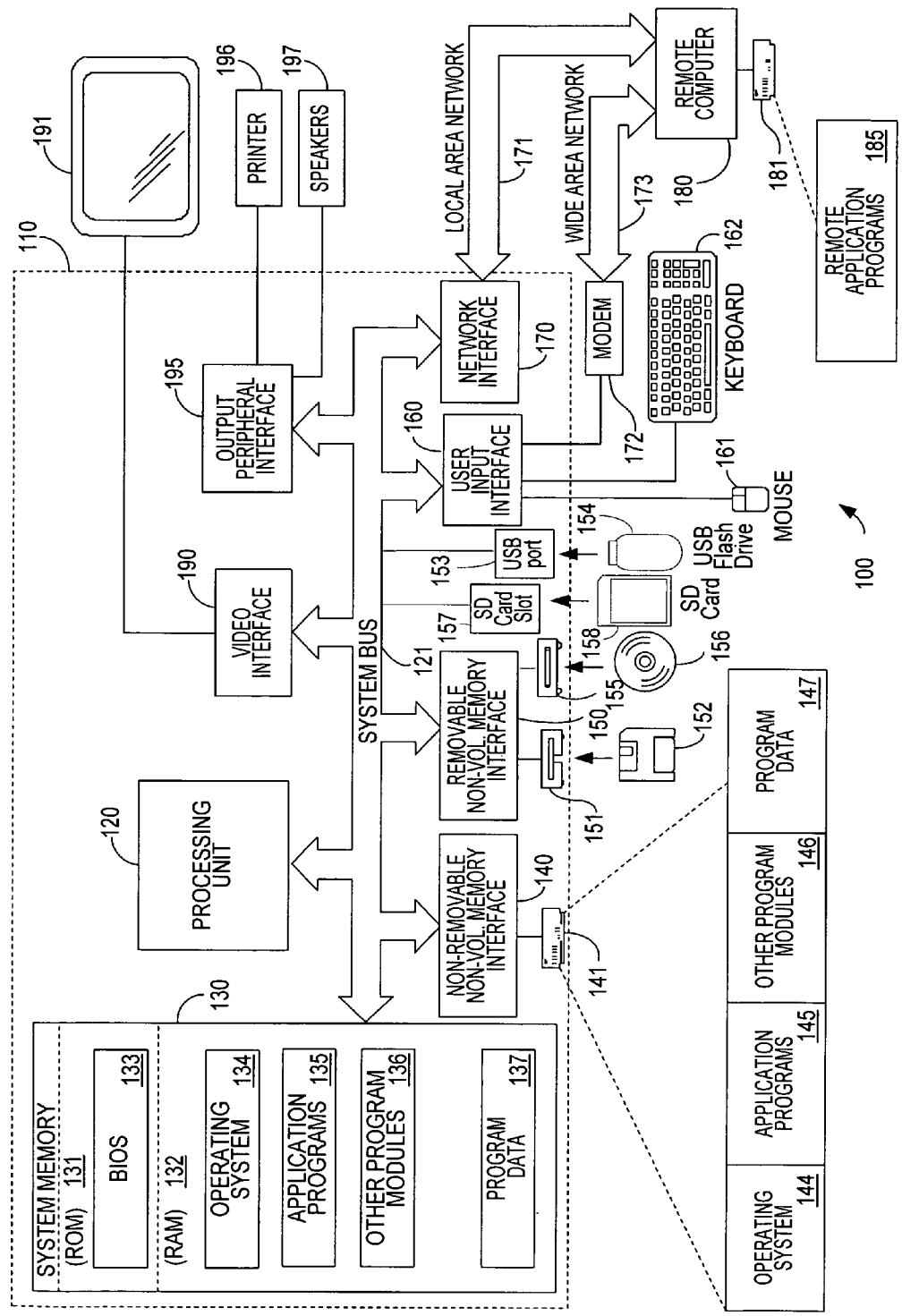
FIG. 1 is a schematic diagram illustrating an exemplary architecture of a computing device that may be used as part of a wireless network implementing a communication configuration process in accordance with an embodiment of the invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100. Although computing devices suitable for use within at least one embodiment of the invention do include each component illustrated in the exemplary operating environment 100, another embodiment of the invention utilizes a device that excludes some or all non-essential components, for example, input/output devices other than those required for network communications.

That said, one example system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer-readable media. Computer-readable media can be any available media that can be accessed by the computer 110 and include both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can be accessed by the computer 110.

The system memory 130 includes computer storage media in the form of volatile and/or nonvolatile memory such as read only memory (ROM) 131 and random access memory (RAM) 132. By way of example, and not limitation, FIG. 1 illustrates operating system 134, application programs 135, other program modules 136 and program data 137.

The computer 110 may also include other removable and non-removable, volatile and nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The computer system may include interfaces for additional types of removable non-volatile storage devices. For instance, the computer may have a USB port 153 that can accept a USB flash drive (UFD) 154, or a SD card slot 157 that can accept a Secure Digital (SD) memory card 158. A USB flash drive is a flash memory device that is fitted with a USB connector that can be inserted into a USB port on various computing devices. A SD memory card is a stamp-sized flash memory device. Both the USB flash drive and SD card offer high storage capacity in a small package and high data transfer rates.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing an operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 by way of an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 preferably operates or is adaptable to operate in a networked environment using logical connections to one or more remote computers, such as a remote computer 180. The remote computer 180 may be a personal computer, a server, a router, a peer device or other network node, and typically includes some or all of the elements described above relative to the computer 110, although only a memory storage device 181 has been illustrated in FIG. 1. The logical connections depicted in FIG. 1 include a LAN 171 and a WAN 173, but may also include other networks.

When used in a LAN environment, the computer 110 is connectable to the LAN 171 through a network interface or adapter 170. The computer 110 may also include a modem 172 or other means for establishing communications over the WAN 173. The modem 172, which may be internal or external, may be connected to the system bus 121 by way of the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The "capacity" (C) or bandwidth of a network link as used herein is the maximum data rate that it can support on a sustained basis. Although capacity is sometimes loosely referred to as the raw bandwidth of the link, this is not entirely accurate. For example, when a traffic shaper such as a token bucket is used to "manage" the link's bandwidth, the raw bandwidth and capacity will be different. The available bandwidth (A) of a link is its unused capacity, i.e., its capacity C minus the time-averaged volume of traffic that it is carrying.

The "narrow link" of an Internet path is the link having the least capacity. The tight link is the link having the least amount of available bandwidth. Thus, the capacity of an Internet path is the capacity of the narrow link on that path. The available bandwidth of an Internet path is the available bandwidth of the tight link on that path. In general, a path may have multiple narrow links and/or tight links with identical capacities or available bandwidths. Thus, although the description herein is given with respect to a network path having a single narrow link and a single tight link, it will be appreciated by those of skill in the art that the described techniques can easily be equivalently extended to network paths having multiple narrow and/or tight links.

As noted above, a primary concern for network communications applications is to be able to accurately measure the available bandwidth of an Internet path. The current methods for measuring available bandwidth along an Internet path are of two generalized types, (1) the probe rate model (PRM), and (2) the probe gap model (PGM).

The PRM methods send a train of probes packets at a given rate $R_i$ from a source computing device to a destination computing device. The probe packets are received at the destination at a certain rate $R_O$. The available bandwidth over the link being probed corresponds to the rate up to which $R_O$ is roughly equal to $R_i$. As the sending rate $R_i$ is then increased beyond this rate matching the available bandwidth, the packets will no longer be received at the rate at which they are being sent.

On the other hand, the PGM methods send a pair of equal-sized probe packets from a source computing device to a destination computing device, where the packets are spaced apart in time by a delay amount $d_i$, which is no greater than the expected transmission time of either probe packet on the narrow and tight link (computed separately). The packets emerge at the destination with a typically greater spacing of $d_O$. The inter-packet spacing is typically measured between the trailing edges of the two packets. Based on the difference between $d_i$ and $d_O$ (i.e., based on the delay induced by the network path) the available bandwidth of the Internet path of interest can be estimated.

The PGM methods have a significant drawback. These methods work correctly only if the narrow link and tight link along an Internet path are the same link. The principle aim of this document is to describe a technique to correct this drawback. The following discussion will describe the PGM method in more detail, and then describe a way to correct the above-mentioned drawback.

Figure 2:
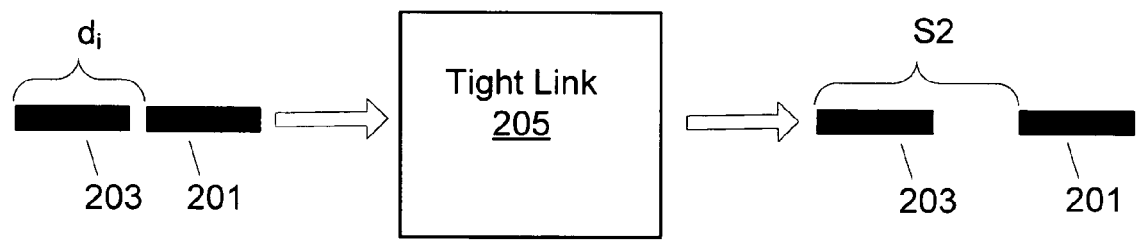
FIG. 2 is a packet path diagram corresponding to the probe gap model.

A packet path diagram corresponding to the PGM model is shown in FIG. 2. Typically, two equal-sized probe packets 201, 203 are sent separated by a delay $d_i$. As explained below, the PGM method requires that the second probe packet 203 arrive in the queue of the tight link 205 no later than when the first probe packet 201 departs. This is why the PGM methods require that the tight and the narrow link to be the same.

Let $t_0$ be the time instant when the first probe packet 201 sent by the sender arrives in the queue of the tight link 205. At some time $t_1$ this packet arrives at the head of the queue, at which point its transmission starts. The transmission is completed at time $t_2$. Now assume that the second packet 203 arrives in the queue of the tight link 205 at time t'. If $t_0 < t' \leq t_2$, the transmission of the second packet 203 will be delayed by any packets (i.e., cross traffic) that arrive in the queue of the tight link 205 between $t_0$ and t', resulting in an increase in the output delay $d_O$ corresponding with the volume of cross-traffic. In particular, if $d_i$ is equal to the transmission time of either probe packet on the narrow and tight link (implying that $t' \leq t_2$, i.e., the second probe packet arrives no later than when the first one finishes transmission), then $d_O - d_i$ will be exactly equal to the time to transmit the cross-traffic. So the available bandwidth can be estimated as $A = C \times (1 - (d_O - d_i)/d_i)$.

However, if $t' > t_2$ (i.e., the second probe packet arrives after the first one has departed), the PGM method breaks down because there is now no information on the traffic that might have arrived and departed the queue between $t_2$ and t'. Thus, the PGM method requires that the second probe packet 203 arrive at the queue of the tight link 205 no later than when the first probe packet 201 has finished transmitting. The condition $t' \leq t_2$ is easy to ensure if the tight and the narrow link are the same. Using knowledge of the capacity, C, of the narrow link (estimated, for instance, using end-to-end techniques such as packet-pair), one simply has to ensure that $d_i$ is no more than the transmission time of either probe packet 210, 203 on the narrow link.

However, if the tight link is not the same as the narrow link, the PGM method breaks down. If the narrow link precedes the tight link, then the spacing between the probe packets could get dilated as they exit the narrow link. The resulting gap could be large enough to make t' larger than $t_2$, i.e., make the second probe packet arrive at the tight link after the first one has departed. On the other hand, if the tight link precedes the narrow link, the spacing between the packets at the tight link will be as desired. However, the narrow link could then dilate the spacing between the packets, so the true spacing as determined by the tight link may not be preserved at the destination.

These problems are solved in embodiments of the invention by employing a unique packet probe series structure and processing thereof. We make a couple of assumptions, namely (1) that we know the identity of the tight link in the path, and (2) that we are able to determine the capacities of the links leading up to the tight link, for example using a separate tool such as the known pathchar technique. In overview, the spacing between the probe packets is first adjusted at the source to account for the dilation caused by the links leading up to the tight link, so that the spacing is as desired when the probes get to the tight link. Moreover, in an embodiment of the invention a multi-packet probe is used, wherein the multi-packet probe comprises a large packet followed by two much smaller packets. The large packet is then dropped in an embodiment of the invention after it has traversed the tight link. The two small packets, which are impacted little by subsequent narrow link(s), if any, preserve the spacing set by the tight link all the way to the destination. In an embodiment of the invention, the only knowledge that is needed before hand is which link in the path is the tight link, and the bandwidths of the links preceding the tight link. This can be estimated using existing end-to-end techniques such as pathchar and packet tailgating.

Figure 3:
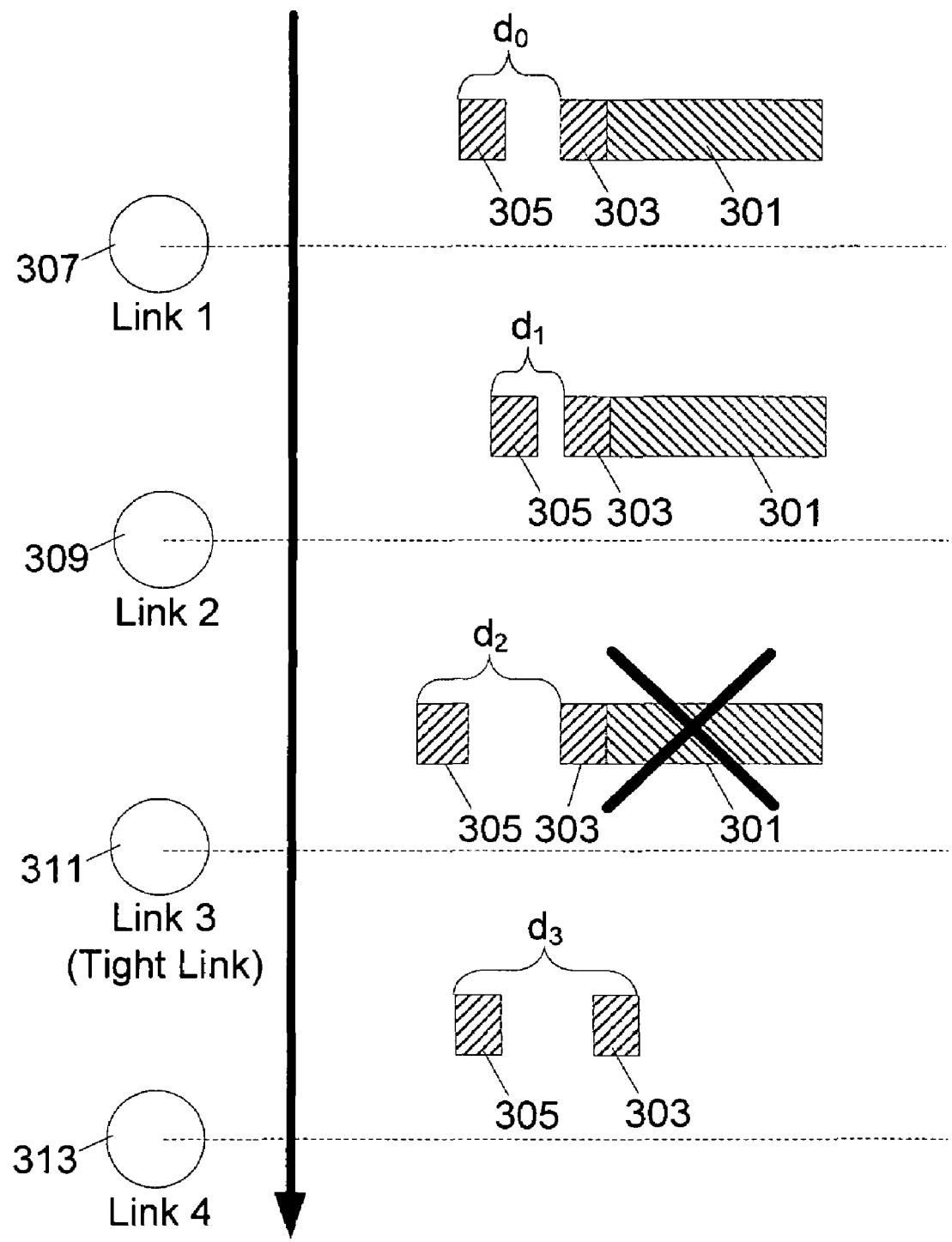
FIG. 3 illustrates an idealized packet timing plot showing the way in which packet trains are used to estimate available bandwidth according to an embodiment of the invention.

A solution according to an embodiment of the invention is illustrated in FIG. 3. In particular FIG. 3 shows a temporal diagram of a packet train according to an embodiment of the invention as it traverses a number of links sequentially. The train consists of 3 packets, namely a large pilot packet 301 followed by two small packets 303, 305. The packet train is shown traversing a series of links 307, 309, 311, and 313. In an embodiment of the invention, the large packet 301 is of a size equal to the path MTU (e.g., 1500 bytes for many network paths) and the small packets 303, 305 are minimum-size IP packets (40 bytes). However, other packet sizes may be used as will be appreciated by those of skill in the art. The large packet 301 and the first small packet 303 are sent back-to-back or as closely spaced as possible. The second small packet 305 is sent after a gap of $d_O$, where $d_O$ is equal to the sum of the transmission time of the large packet 301 on all links up to and including the tight link 311. It can be assumed that the transmission time of each small packet is negligible although this assumption is not necessary. In an embodiment of the invention, a time-to-live (TTL) property of the large packet 301 is set such that the large packet 301 is dropped immediately after it traverses the tight link 311.

As this packet train 301, 303, 305 travels down the network path through the various links 307, 309, 311, 313, each successive link causes the gap between the two small packets 303, 305 to shrink by an amount equal to the transmission time of the first packet 301. At the tight link 311, the gap is equal to the transmission time of the first packet 301 on the tight link 311. Since the second packet 303 follows the first packet 301 closely, the third packet 305 will enter the queue of the tight link 311 before the second packet 303 has exited it. Thus the spacing between the two small packets 303, 305 at the input of the tight link 311 is exactly what the PGM method would require it to be for an accurate estimation available bandwidth. The spacing at the output of the tight link 311 will reflect the transmission time of the cross-traffic. Since the large packet 301 is dropped once it has traversed the tight link 311 and only the small packets 303, 305 travel to the destination, bandwidth-constrained links downstream of the tight link, e.g., link 313, will have little impact on the spacing.

Figure 4:
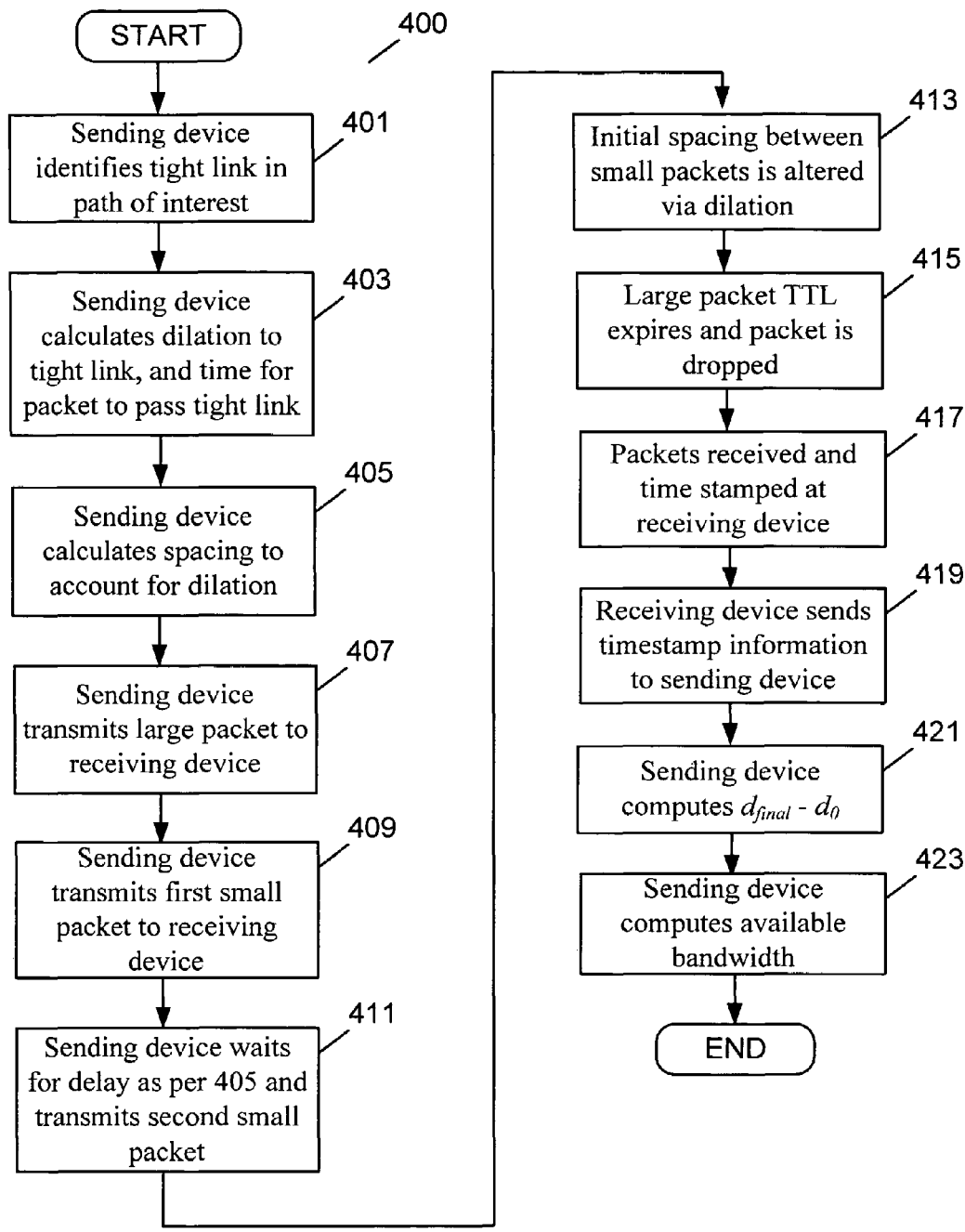
FIG. 4 illustrates a flow chart showing a process of estimating available bandwidth over a network path having a tight link according to an embodiment of the invention.

A flow chart illustrating a process according to an embodiment of the invention is shown in FIG. 4. At step 401 of the process 400, the sending device identifies the tight link in a path of interest. The sending device calculates, at step 403, the amount of dilation expected to be caused by the network links in the path of interest leading up to the tight link, and the amount of time expected for a large packet (e.g., of MTU size) to pass the tight link. Subsequently at step 405, the sending device calculates a spacing to place between probe packets to account for the dilation. The sending device then transmits a first packet of large size, such as MTU (e.g., 1500 bytes) at step 407 onto the network, via the path of interest, to a receiving device. The TTL of the packet is set to the amount of time expected for the packet to pass the tight link as calculated in step 403.

At step 409, the sending device transmits a small packet (e.g., a minimum-size IP packet of 40 bytes) onto the network, via the path of interest, to the receiving device. Next, in order to complete the packet train, the sending device waits for the delay time calculated above in step 405, and then in step 411 transmits another small packet, possibly but not necessarily of the same size as the first, onto the network via the path of interest to the receiving device.

After the steps outlined above, the packet train traverses the path of interest and its links. The initial spacing between small packets is altered via dilation in step 413 as expected so that the effects of dilation are eliminated by the offset in the initial spacing. As the train, or at least the large packet, passes the tight link, the TTL of the large packet expires and it is dropped in step 415.

At the receiving device, the received packets (now just the small packets) are received and time stamped at step 417, so that the relative delay between the packets can be recorded. At step 419, the receiving device forwards one or more summary messages to the sending device indicating the timestamp information. Finally, the sending device computes the relative delay $d_{final}$ between the packets in step 421 and subtracts from the computed delay $d_{final}$ the known packet spacing at the input to the tight link. This difference accurately represents the amount of delay introduced by the tight link, thus allowing the available bandwidth on the link of interest to be calculated in a standard manner by the sending device in step 423.

Note that the use of a single train of three packets as described above can yield an estimate of available bandwidth for a particular point in time. However, the available bandwidth may rise and fall, and an average value rather than a particular value is used in an embodiment of the invention. In particular, the process illustrated above in FIG. 4 is repeated multiple times as is suitable given the stability or instability of a particular environment, and an available bandwidth value is computed for each such measurement. The computed available bandwidth values are then averaged together in various ways to form an average available bandwidth value.

It will be appreciated that a new and useful system for network bandwidth estimation has been described. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Any recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of measuring available bandwidth over a network path between at least a source computing device and a receiving computing device, the network path comprising a plurality of links, at least one link being a tight link having a lesser amount of available bandwidth than any other link in the network path, the method comprising:

transmitting a large pilot packet after it traverses the tight link and before it reaches the receiving computing device;

dropping the large pilot packet after it traverses the tight link and before it reaches the receiving computing device, wherein the large pilot packet has a time-to-live parameter and wherein the step of dropping the large pilot packet comprises dropping the large pilot packet upon the expiration of its time-to-live;

transmitting a packet pair from the source computing device to the receiving computing device to the receiving computing device immediately following the transmission of the large pilot packet, wherein the packet pair comprises at least two packets separated by an initial delay and does not include another large pilot packet, and wherein each of the at least two pilot packets has a smaller size than the large pilot packet; and obtaining at the source computing device from the receiving computing device an indication of the relative delay between the packets of the packet pair as they arrived at the receiving computing device.

2. The method according to claim 1, further comprising calculating at the source computing device an available bandwidth value for the network path based on the relative delay between the packets of the packet pair as they arrived at the receiving computing device.

3. The method according to claim 1, wherein transmitting a packet pair from the source computing device to the receiving computing device immediately following the transmission of the pilot packet, wherein the packet pair comprises at least two packets separated by an initial delay, further comprises calculating an amount of dilation expected to be experienced by the packet pair en route to the tight link and setting the initial delay between the packets of the pair to account for the expected dilation.

4. The method according to claim 1, wherein obtaining at the source computing device from the receiving computing device an indication of the relative delay between the packets of the packet pair as they arrived at the receiving computing device comprises obtaining time stamp information from the receiving computing device, wherein the time stamp information indicates the respective times at which the packets arrived at the receiving computing device.

5. The method according to claim 2, wherein the step of calculating an available bandwidth value for the network path based on the relative delay between the packets of the packet pair as they arrived at the receiving computing device further comprises differencing the relative delay between the packets of the packet pair as they arrived at the receiving computing device and the delay between the packets as they arrived at the tight link.

6. The method according to claim 2, further comprising repeating the set of steps a predetermined number of times.

7. The method according to claim 6, wherein repeating the set of steps a predetermined number of times yields a plurality of available bandwidth values for the network path, the method further comprising averaging the plurality of available bandwidth values to yield an average available bandwidth.

8. A computer-readable medium having thereon computer-readable instruction for performing a method of measuring available bandwidth over a network path between at least a source computing device and a receiving computing device, the network path comprising a plurality of links, at least one link being a tight link having a lesser amount of available bandwidth than any other link in the network path, the instructions comprising instructions for:

transmitting a large pilot packet after it traverses the tight link and before it reaches the receiving computing device;

dropping the large pilot packet after it traverses the tight link and before it reaches the receiving computing device, wherein the large pilot packet has a time-to-live parameter and wherein the step of dropping the large pilot packet comprises dropping the large pilot packet upon the expiration of its time-to-live;

transmitting a packet pair from the source computing device to the receiving computing device to the receiving computing device immediately following the transmission of the large pilot packet, wherein the packet pair comprises at least two packets separated by an initial delay and does not include another large pilot packet, and wherein each of the at least two packets has a smaller size than the large pilot packet; and obtaining at the source computing device from the receiving computing device an indication of the relative delay between the packets of the packet pair as they arrived at the receiving computing device.

9. The computer-readable medium according to claim 8, further comprising instructions for calculating at the source computing device an available bandwidth value for the network path based on the relative delay between the packets of the packet pair as they arrived at the receiving computing device.

10. The computer-readable medium according to claim 8, wherein the instructions for transmitting a packet pair from the source computing device to the receiving computing device immediately following the transmission of the pilot packet, wherein the packet pair comprises at least two packets separated by an initial delay, further comprises instructions for calculating an amount of dilation expected to be experienced by the packet pair en route to the tight link and setting the initial delay between the packets of the pair to account for the expected dilation.

11. The computer-readable medium according to claim 8, wherein the instructions for obtaining at the source computing device from the receiving computing device an indication of the relative delay between the packets of the packet pair as they arrived at the receiving computing device comprise instructions for obtaining time stamp information from the receiving computing device, wherein the time stamp information indicates the respective times at which the packets arrived at the receiving computing device.

12. The computer-readable medium according to claim 9, wherein the instructions for calculating an available bandwidth value for the network path based on the relative delay between the packets of the packet pair as they arrived at the receiving computing device further comprise instructions for differencing the relative delay between the packets of the packet pair as they arrived at the receiving computing device and the delay between the packets as they arrived at the tight link.

13. The computer-readable medium according to claim 9, further comprising instructions for repeating the instruction a predetermined number of times.

14. The computer-readable medium according to claim 13, wherein repeating the instructions a predetermined number of times yields a plurality of available bandwidth values for the network path, the computer-readable medium further comprising instructions for averaging the plurality of available bandwidth values to yield an average available bandwidth.

* * * * *